United States Patent [19]

Stapleton

[11] Patent Number: 5,732,863
[45] Date of Patent: Mar. 31, 1998

[54] ARTICLE CARRIER ASSEMBLY

[75] Inventor: Craig A. Stapleton, Clarkston, Mich.

[73] Assignee: Advanced Accessory Systems LLC, Port Huron, Mich.

[21] Appl. No.: 635,374

[22] Filed: Apr. 19, 1996

[51] Int. Cl.$^6$ ........................................ B60R 9/04
[52] U.S. Cl. .......................... 224/321; 224/309; 384/37; 384/42
[58] Field of Search ........................ 224/309, 314, 224/315, 321, 322, 325, 326, 329, 330, 331; 384/10, 23, 37, 42; 312/349, 334.36, 334.16, 200; 248/429

[56] References Cited

U.S. PATENT DOCUMENTS

| 260,631 | 9/1882 | Kowalski . |
| 2,751,272 | 6/1956 | Hutzelman ............... 312/334.16 |
| 3,184,208 | 5/1965 | Tanaka ........................ 248/429 |
| 3,253,755 | 5/1966 | Bott . |
| 3,451,602 | 6/1969 | Bott . |
| 4,099,658 | 7/1978 | Bott . |
| 4,165,827 | 8/1979 | Bott . |
| 4,239,138 | 12/1980 | Kowalski . |
| 4,244,501 | 1/1981 | Ingram . |
| 4,295,588 | 10/1981 | Kowalski et al. . |
| 4,460,116 | 7/1984 | Bott ............................. 224/321 |
| 4,756,603 | 7/1988 | Fujita ............................ 384/42 |
| 4,834,448 | 5/1989 | Sakamoto et al. ............. 224/309 |
| 4,877,168 | 10/1989 | Bott . |
| 4,967,945 | 11/1990 | Bott . |
| 4,982,886 | 1/1991 | Cucheran . |
| 5,004,139 | 4/1991 | Storm et al. .................... 224/309 |
| 5,046,698 | 9/1991 | Venier ........................... 248/429 |
| 5,082,158 | 1/1992 | Bott . |
| 5,203,483 | 4/1993 | Cucheran ....................... 224/326 |
| 5,385,285 | 1/1995 | Cucheran et al. ............... 224/326 |
| 5,400,938 | 3/1995 | Kolodziej et al. .............. 224/321 |
| 5,402,925 | 4/1995 | Arvidsson et al. ............. 224/309 |
| 5,456,512 | 10/1995 | Gibbs et al. ................... 224/321 |
| 5,553,761 | 9/1996 | Audoire et al. ................ 224/321 |
| 5,588,572 | 12/1996 | Cronce et al. .................. 224/321 |

FOREIGN PATENT DOCUMENTS

94/10007   5/1994   WIPO ........................... 224/321

*Primary Examiner*—Henry J. Recla
*Assistant Examiner*—Gregory M. Vidovich
*Attorney, Agent, or Firm*—Rader, Fishman & Grauer PLLC

[57] ABSTRACT

An article carrier assembly for a vehicle body panel includes a pair of side rails adapted for attachment to the body panel, a pair of retainers engaging the side rails, and a cross rail extending between the retainers. Each of the pair of retainers includes a foot slidably disposed within the side rails, each foot forming a plurality of compression tubes therein for compressible engagement with the respective side rail to prevent rattles. The side rail assembly includes a roll-formed inner side rail for receiving the retainer and a roll-formed outer side rail secured to stand-off ribs extending from a side rail center support. An alternative side rail assembly provides a roll-formed side rail supported by a pad having an internal snap hook formed thereon, and an outer trim rail having a resilient snap tab for engagement with the snap hook for securing the trim rail to the pad in a manner to prevent rattles.

7 Claims, 2 Drawing Sheets

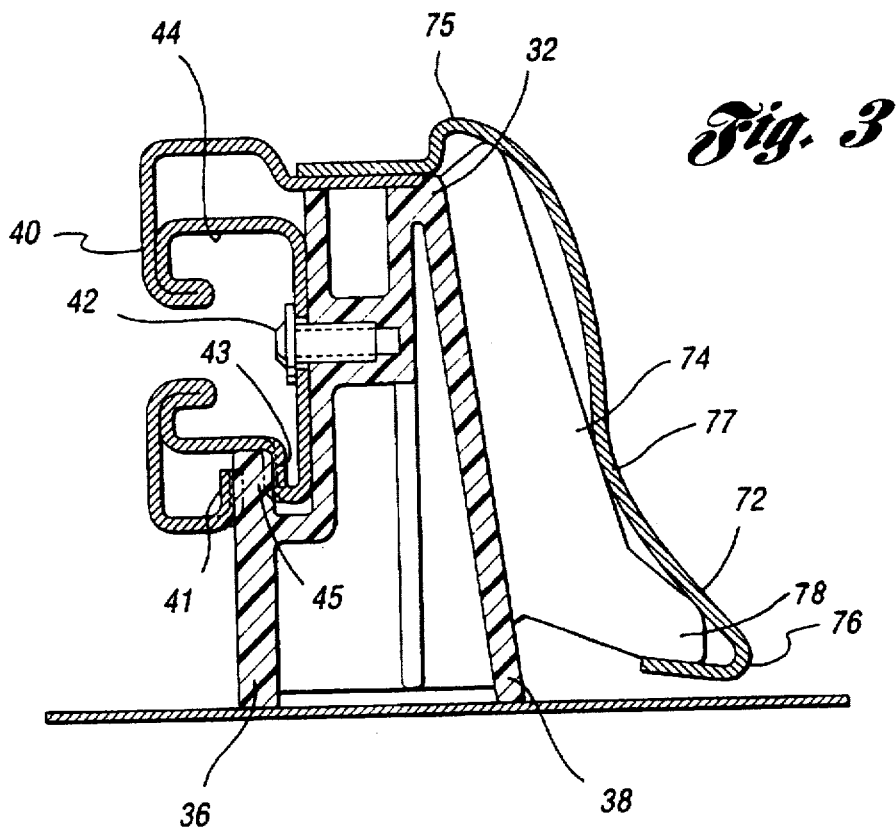
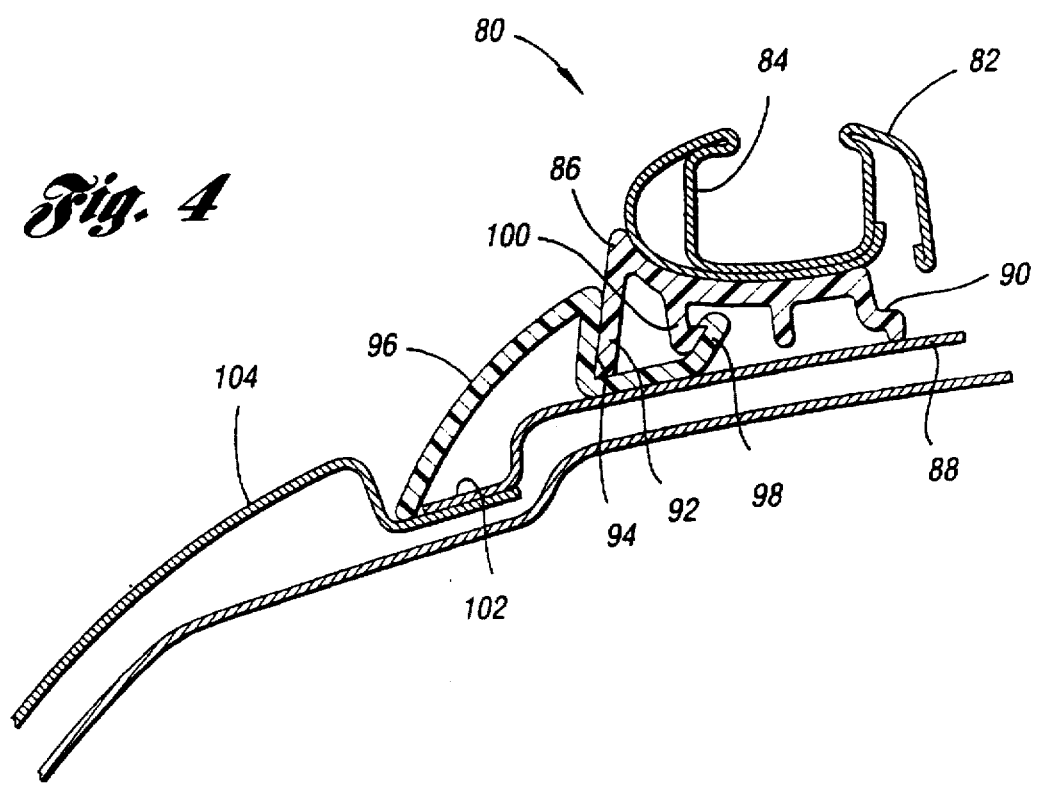

1

ARTICLE CARRIER ASSEMBLY

TECHNICAL FIELD

The present invention relates to article carrier assemblies for vehicle roofs, and more particularly to article carrier assemblies with improved noise damping and styling features.

BACKGROUND OF THE INVENTION

Automotive designers have reduced vehicle noise in many design areas. However, automotive accessories such as roof mounted article carrier assemblies remain a potential source of rattle and wind noise for vehicles. Such assemblies typically include a pair of side rails mounted to the roof with at least one cross rail extending therebetween. Stanchions on opposing ends of the cross rail attach the cross rail to the side rails. These stanchions are usually secured to the cross rails by clamps or other such mechanisms. The side rails, stanchions and clamps are a potential source of rattles or squeaks during vehicle movement.

Additionally, article carrier assemblies are highly visible, and thus a styling concern. Article carrier assemblies are also expected to provide sufficient strength for supporting heavy articles, and it is a difficult design task to combine trim styling with sufficient strength in such assemblies. In other words, the side rails are typically too bulky to give the appearance of a trim rail as a result of strength requirements, and attempts to design the side rails as trim rails are discouraged as a result of expected loss of article carrier structural integrity. It is desirable to provide such features in a manner in which squeaks and rattles are kept at a minimum.

DISCLOSURE OF THE INVENTION

The present invention overcomes the above-reference shortcomings of prior art article carrier assemblies by providing an article carrier assembly which meets structural integrity requirements while being used in combination with a trim rail for styling purposes in a manner in which squeaks and rattles are reduced. This is accomplished by providing an article carrier assembly design having a trim rail, and which includes hidden compression members such as compression tubes or resilient interference between exterior surfaces of components to reduce rattle.

More specifically, a first aspect of the present invention provides an article carrier assembly for a vehicle body panel, comprising a pair of side rails adapted for attachment to the vehicle panel, at least one crossbar extending between the pair of side rails, and a pair of retainers on the crossbar engaging the side rails. Each of the retainers have a foot slidably disposed within the respective side rail. Each foot includes a plurality of compression tubes therein for compressible engagement with the respective side rail to prevent rattles.

Another aspect of the present invention provides an article carrier assembly for a vehicle body panel in which the side rails include a center support secured to the body panel, wherein the center support provides a plurality of stand off ribs extending therefrom. An inner side rail is secured to the center support for receiving the respective retainer, and a resilient outer trim rail resiliently engages and is supported by the stand off ribs in a manner to prevent rattles.

Yet another aspect of the present invention provides a side rail assembly for supporting a retainer of a vehicle article carrier assembly in which a pad supports the side rail with respect to the body panel and includes an internal snap hook formed thereon for engagement with a corresponding resilient snap tab on an outer trim rail for engagement therewith. The resilient engagement between the snap hook and the snap tab secures the trim rail to the pad in a manner to prevent rattles.

Accordingly, an object of the present invention is to provide an article carrier design which combines trim styling with sufficient strength for supporting articles, while having adjacent components engaged in a manner to prevent rattles.

Another object of the present invention is to provide an article carrier assembly which includes hidden compression members or hidden resilient attachment members which reduce rattle.

The above objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 3 shows a vertical cross section of the side rail assembly shown in FIG. 2; and FIG. 4 shows the vertical cross section of an alternative side rail assembly in accordance with the present invention.

DETAILED DESCRIPTION OF THE BEST MODES

Figure 1:
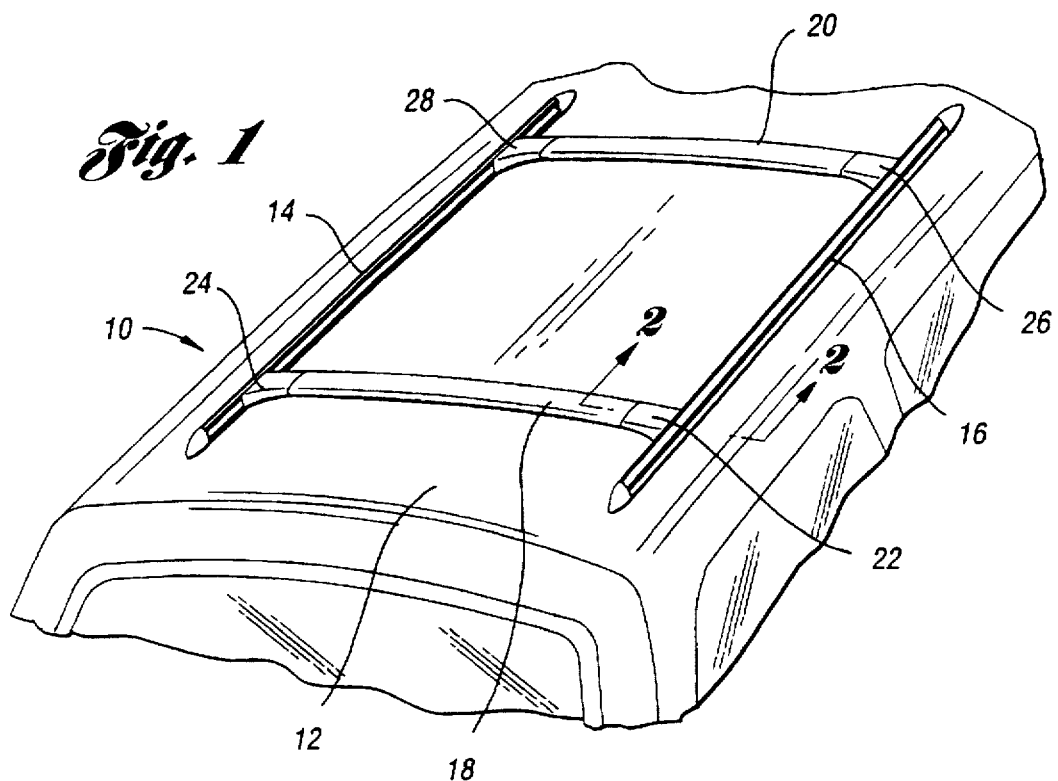
FIG. 1 shows a cut-away perspective view of an article carrier assembly secured to a vehicle roof in accordance with the present invention.

FIG. 1 shows a perspective view of an article assembly 10 secured to a vehicle roof 12 in accordance with the present invention. The article carrier assembly 10 includes first and second side rails 14,16 attached to the vehicle roof 12. First and second cross rails 18,20 extend across the vehicle roof 12 for carrying articles thereon. The cross rails 18,20 are secured to the side rails 14,16 by the respective retainers 22,24,26 and 28.

Figure 2:
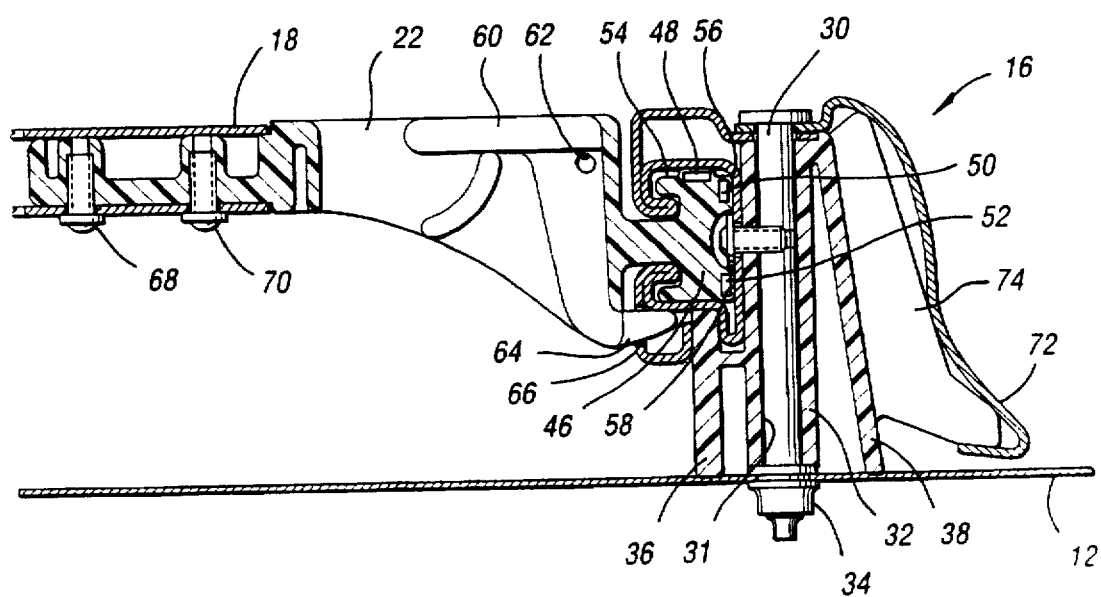
FIG. 2 shows a vertical cross section of a first embodiment of a cross rail and retainer secured to a side rail on a vehicle roof in accordance with the present invention.

Turning to FIGS. 2 and 3, a preferred embodiment of a side rail 16, cross rail 18, and retainer 22 is shown attached to the vehicle roof 12. The side rail 16 comprises an upstanding attachment screw 30 which extends through a central aperture 31 of a center support 32 for securing the center support 32 to the vehicle roof 12. A rivnut 34 engages the end of the screw 30 for attachment to the roof 12. The rivnut 34 is provided with a foam bead under its head for sealing. The center support 32 includes support legs 36,38, which, in combination with the upstanding attachment screw 30, may provide a relatively tall center support 32, as shown. The support legs 36,38 provide lateral stability for the center support 32, which enables the side rail 16 to be relatively tall, as shown. This is desirable for use with certain designs which require a large, upstanding article carrier assembly.

A roll-formed inner side rail 40, as clearly shown in FIG. 3, is secured to the center support 32 by a plurality of attachment screws 30 and support screws 42. The roll-formed inner side rail 40 forms an elongate channel 44 therein for receiving the foot 46 of the retainer 22. The foot 46 of the retainer is preferably a T-portion which is slidably disposed within the elongate channel 44, and includes a plurality of compression tubes 48,50,52 preferably formed by hollow chambers therein beneath the external walls for compressible engagement against an adjacent wall of the inner side rail 40. Preferably, compression tubes 48,50,52 are molded-in, closed, elongated voids formed in the T-portion 46 along the exterior walls 54,56,58 of the T-portion. The three compression tubes 48,50,52 are compressible when the T-portion 46 is retained in the elongate channel 44, which creates a snug fit to prevent rattles. Of course, a greater number of compression tubes provides greater cushion from noise.

The inner side rail 40 includes lower portions 41,43 which could, alternatively, compressibly engage the upper portion 45 of the support leg 36 in a manner to prevent rattles. The lower portions could be formed in the configurations shown in phantom in FIG. 3, and resiliently engaged against the upper portion 45 of support leg 36 when assembled with the center support 32.

The retainer 22 includes a pull lever 60 which is pivotally mounted to the retainer by a press pin 62. A torsion spring (not shown) biases the pull lever 60 toward a position of engagement wherein the hook portion 64 of the pull lever 60 engages one of a plurality of indexing holes 66 formed in the inner side rail. When in the disengaged position (not shown), a detent is provided to secure the pull lever 60 in the disengaged position so that the hook portion 64 is unlatched from the indexing holes 66 to allow the user to easily slide the cross rail 18 along the side rails 14,16.

The retainer assembly 22 is preferably an injected molded polycarbonate material. The retainer assembly 22 is secured within the cross rail 18 by a pair of attachment screws 68,70. The cross rail 18 is preferably a roll-formed steel or aluminum extrusion to provide sufficient structural integrity for supporting heavy articles.

As a styling feature, the side rail 16 is further provided with an outer side rail 72. The outer side rail 72 is secured to the center support 32 by the plurality of attachment screws 30, and by snap-fit engagement with the upstanding ribs 74 protruding from the center support 32. The outer side rail 72 is formed of a resilient material for an interference fit with the upstanding ribs 74, thereby preventing rattle while providing a stylish appearance. The outer side rail 72 is preferably a roll-formed aluminum having first and second curved end portions 75,76, and a central compression portion 77. The first curved end portion 75 stands above the attachment screw 30 to hide the screw 30 for styling reasons. The attachment screw 30 secures the first end portion 75, and the second curved end portion engages the protruding portion 78 of the ribs 74. The outer side rail 72 is configured in a manner such that attachment of the ends 75,76 forces the central compression portion 77 against the ribs 74 to resiliently bend the outer side rail 72 to prevent rattles.

An alternative side rail assembly 80 is shown in FIG. 4. The side rail assembly 80 includes a roll-formed aluminum side rail 82 which forms an elongate channel 84 therein for receiving a retainer. A pad 86 supports the side rail 82 with respect to the vehicle roof panel 88. The pad 86 is preferably an extruded TPO material, and includes a first leg 90 for supporting the pad 86 on the roof 88, and a second leg 92 which extends into a notch 94 formed in the outer trim rail 96. The legs 90,92 provide lateral support for the pad 86. The outer trim rail 96 is also preferably an extruded TPO material, and includes a resilient snap tab 98 which engages a corresponding internal snap hook 100 on the pad 86. The resilient engagement between the snap tab 98 and the snap hook 100 creates a snug fit which alleviates rattles in the assembly. Similarly, the wall 92 is angled outwardly from the snap hook 100 for resilient retention in the notch 94. The pad 86 and outer trim rail 96 support the roll-formed side rail 82 with respect to the vehicle roof 88, and are preferably secured to the roof 88 by a plurality of attachment screws and rivnuts (not shown) extending through both the pad 86 and the side rail 82.

The outer trim rail 96, as shown in FIG. 4, extends into a joint channel 102 formed between the roof panels 88,104. This configuration gives the appearance of the trim rail 96 and side rail assembly 80 blending into the contour of the roof panel 104 for styling purposes.

While the best modes for carrying out the invention have been described in detail, those familiar with the art to which this invention relates recognize various alternative designs and embodiments for practicing the invention within the scope of the appended claims.

What is claimed is:

1. An article carrier assembly for a vehicle body panel, comprising:

a pair of side rails adapted for attachment with respect to the vehicle body panel;

a pair of retainers engaging said side rails;

a cross rail extending between said pair of retainers; and each of said pair of retainers having a foot slidably disposed within said side rails, each said foot including a plurality of compression tubes therein positioned for compressible engagement with the respective side rail to prevent rattles, wherein said side rails each include indexing holes formed therealong, and said retainers each comprise a latch having a hook engageable with said indexing holes for securing said cross rail along said side rails.

2. The article carrier assembly of claim 1, wherein said foot is a T-portion that includes engagement surfaces on its outer walls and said compression tubes comprise closed, molded-in compressible elongated voids formed in each said T-portion along said engagement surfaces.

3. The article carrier assembly of claim 1, wherein each said side rail comprises:

an upstanding attachment screw attachable to the body panel;

a center support cooperating with said attachment screw;

a roll-formed inner side rail secured to said center support and forming an elongate channel therein for receiving the respective foot; and a roll-formed outer side rail secured to said center support.

4. The article carrier assembly of claim 3, wherein said center support comprises a plurality of standoff ribs engageable with said outer side rail.

5. The article carrier assembly of claim 3, wherein each said channel opens in a direction perpendicular to the central axis of said upstanding attachment screw.

6. An article carrier assembly for a vehicle body panel, comprising:

a cross rail with retainers on opposing ends thereof; and a pair of side rails adapted for attachment with respect to the vehicle body panel, each said side rail including a center support secured to the body panel, the center support having a plurality of standoff ribs extending therefrom, an inner side rail secured to the center support for receiving the respective retainer, and a resilient outer trim rail having first and second curved end portions and a central compression portion resiliently engaging and supported by said standoff ribs in a manner to prevent rattles, wherein said side rails each include indexing holes formed therealong, and said retainers each comprise a latch having a hook engageable with said indexing holes for securing said cross rail along said side rails.

7. The article carrier assembly of claim 6, wherein each said retainer comprises a T-portion engageable with the respective side rail, said T-portion including a plurality of compression tubes for compressible engagement with an adjacent wall of the respective inner side rail to prevent rattles.

* * * * *